Figure 1:
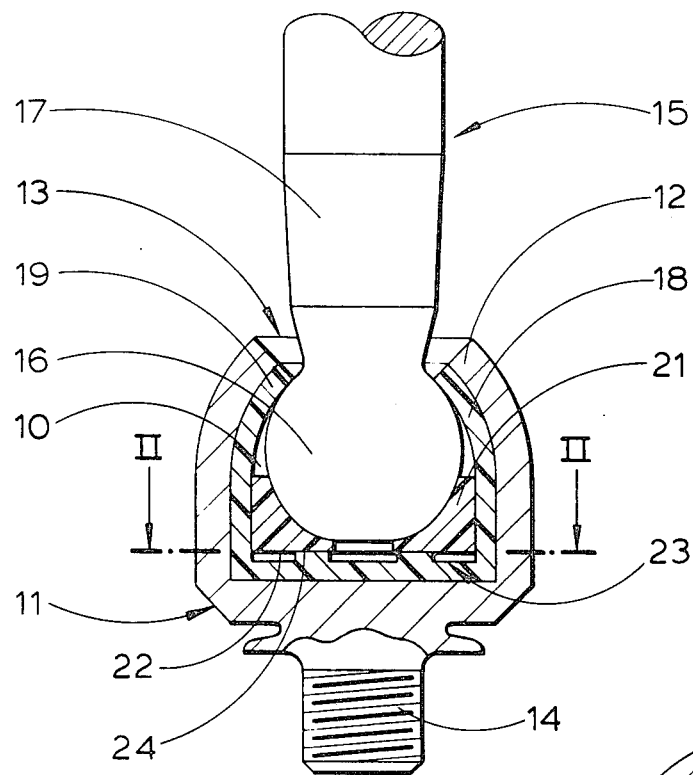

United States Patent [19]

Farrant

[11] 4,297,047

[45] Oct. 27, 1981

[54] BALL AND SOCKET JOINT

[75] Inventor: David J. R. Farrant, Radford Semele, England

[73] Assignee: Automotive Products Limited, Warwichshire, England

[21] Appl. No.: 156,801

[22] Filed: Jun. 5, 1980

[30] Foreign Application Priority Data

Jun. 9, 1979 [GB] United Kingdom ............ 20172/79

[51] Int. Cl.³ ............................................ F16C 11/06
[52] U.S. Cl. .................................................. 403/138
[58] Field of Search ............... 403/130, 131, 132, 133, 403/134, 135, 137, 138, 139, 140, 144

[56] References Cited

U.S. PATENT DOCUMENTS

| 3,363,921 | 1/1968 | Gottschald | 403/130 |
| 3,554,586 | 1/1971 | Cutler | 403/140 |
| 3,574,369 | 4/1971 | Andrew | 403/132 |

FOREIGN PATENT DOCUMENTS

| 52-34167 | 3/1977 | Japan | 403/132 |
| 198811 | 10/1965 | Sweden | 403/133 |
| 982885 | 2/1965 | United Kingdom . | |
| 1195831 | 6/1970 | United Kingdom . | |
| 1280527 | 7/1972 | United Kingdom . | |
| 1315406 | 5/1973 | United Kingdom . | |
| 1398106 | 6/1975 | United Kingdom . | |
| 1490874 | 11/1977 | United Kingdom . | |
| 1506059 | 4/1978 | United Kingdom . | |
| 1512023 | 5/1978 | United Kingdom . | |
| 2003970 | 3/1979 | United Kingdom . | |

Primary Examiner—Andrew V. Kundrat
Attorney, Agent, or Firm—Kemon & Estabrook

[57] ABSTRACT

This invention relates to ball and socket joint assemblies having a socket housing with a cavity in which the head of a ball pin is located. The cavity has a resilient lining, preferably in the form of a bearing cup; and a resilient end cap located in the bottom of the lined cavity so that after assembly of the joint the lining provides a bearing surface on one side of the head, and the end cap provides a bearing surface on the other side of the head. The end cap and the lining are spaced apart by resilient ribs that are held in compression by assembly of the joint.

5 Claims, 2 Drawing Figures

BALL AND SOCKET JOINT

This invention relates to ball and socket joint assemblies particularly, but not exclusively, to such joint assemblies that are suitable for use in the steering and suspension systems of automobiles.

A problem with ball and socket joint assemblies used in motor vehicles is that if the torque load exerted by the socket on the head of the ball pin is too great, or too small, then the steering system will not "feel" correct to the vehicle driver. The problems associated with obtaining the correct torque load range during the manufacture of ball joints are often excacerbated by the additive effects of the production tolerances of the separate components and processes used to assemble together the joint.

One means of reducing the additive effect of production tolerances to an acceptable level is illustrated in British Pat. No. 1,280,527 and its corresponding Patent of Addition No. 1,359,544. In these two patent specifications a resilient bearing cup for the head of a ball pin is provided with a series of resilient projections that abut directly against the socket in which the bearing is housed. On assembly of the joint the projections collapse in a resilient manner and serve to bias the bearing cup against the ball pin head so as to maintain a desired torque load on the head of the ball pin.

The maximum amount of collapse is obviously dependent upon the height of the projections and since most bearing cups are moulded it is desirable for the ease of mould manufacture and moulding, if the height of the projections is as low as possible, consistent with the desire to eleviate the effect of the additive tolerances.

The present invention seeks to increase the amount of collapse for a given height of projection.

Accordingly there is provided a ball and socket joint assembly for the steering and suspension system of a motor vehicle and comprising a socket housing having a cavity therein, a ball pin the head of which is located within the cavity and the shank of which extends through the mouth of the cavity, the cavity having a resilient lining providing a bearing surface for the head adjacent the mouth, and a resilient end cap providing a bearing surface for the head in the base of the cavity, wherein the end cap is housed in the lined cavity and opposed faces of the end cap and lining are spaced apart by resilient projections held in compression by the assembly of the joint.

The amount of possible collapse of the projections is maximised by having the projections act against the resilient socket liner as opposed to acting against the socket housing as in the prior art.

Figure 2:
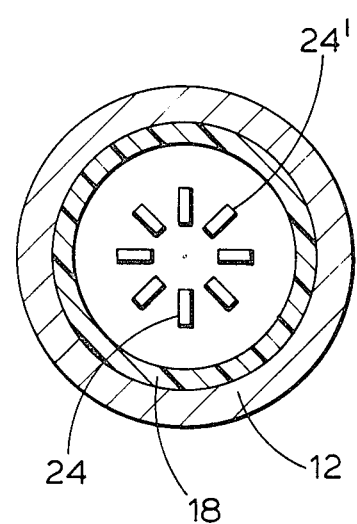

The invention will be described by way of example and with reference to the accompanying drawing in which:

FIG. 1 is a section through a ball and socket joint according to this invention; and FIG. 2 is a section on the line II—II of FIG. 1.

FIG. 1 shows a steering rack-end ball and socket joint 11 suitable for the steering rack of an automobile. The ball and socket joint has a socket housing 12 with a cavity 10 therein whose mouth 13 is at one end of the housing, and a screw-threaded stud 14 secured to the outside of the base at the other end of the housing for attachment of the joint 11 to a steering rack (not shown).

A ball pin 15 has a spherical head 16 located within the cavity 10, and a shank 17 which extends through the mouth 13 of the cavity 10. The mouth 13 is of such a size that the head 16 cannot pass through it and the edge of the mouth also limits the degree that the ball pin 15 can tilt relative to the housing 11.

The internal surface of the cavity 10 has a resilient lining in the form of a polyamide bearing cup 18 the mouth 19 of which is adjacent the mouth 13 of the cavity 10. A resilient end cap 21 of a polyamide or polyurethane material is located in the bottom portion of the bearing cup 18 and has a concave spherical upper surface that engages the head 16 of the ball pin 15 and a flat lower surface 22 that is separated from the internal bottom surface of the base 23 of the bearing cup 18 by eight resilient projections 24, in the form of ribs. The ribs 24 are integral with the base 23 and radiate from a centre located on an axis passing through the centre of the head 16.

The spherical head 16 of the ball pin is located within the bearing cup 18 and the head 16 is supported adjacent the mouth 13, on one side of an equator of the head 16, by portions of the bearing cup 18 which are formed to provide support for the head, and the end cap 21 provides a bearing surface for the head 16 on the other side of the equator adjacent the base of the cup 18.

During the assembly of the joint 11 the end cap 21 and the bearing cup 18 are placed over the head 16 which in turn is placed into the cavity 10 in the then substantially cylindrical housing 11. The mouth 13 of the housing is then turned inwards to envelope the head of the ball pin within the housing 11. The turn over load on the mouth 13 of the housing deforms the mouth 19 of the bearing cup 18, and thereby causes the bearing cup and the end cap 21 to grip the head 16. When the turn over load is applied to turnover the mouth 13 of the housing then the resilient ribs 24 are compressed and when the load is removed after assembly of the joint the ribs are held in compression and urge the end cap 21 against the head.

The height of the ribs 24 is for example 1 mm and is such that after allowing for the "spring back" in the housing 11 after the turn over load is removed, and allowing for additive manufacturing tolerances, then the ribs 24 will still urge the end cap against the head 16 so that the head is gripped by torque control load of an acceptable magnitude. Alternately the ribs 24 can be formed as two sets of ribs 24 and 24' having different respective heights. The ribs 24 being for example 1.5 mm in height and the ribs 24' 1.0 mm in height. The two sets of ribs 24 and 24' are intermixed and alternate one rib 24 with the other rib 24', angularly around the base of the bearing cup 18. In this way the torque load can then be caused to increase with the increasing collapse of the first ribs 24 and then the shorter ribs 24'. The amount of deflection is a reflection of the production tolerances and hence the greater the tolerance to be taken up the greater the collapse before the correct torque control load on the ball head is reached.

Figure 3:
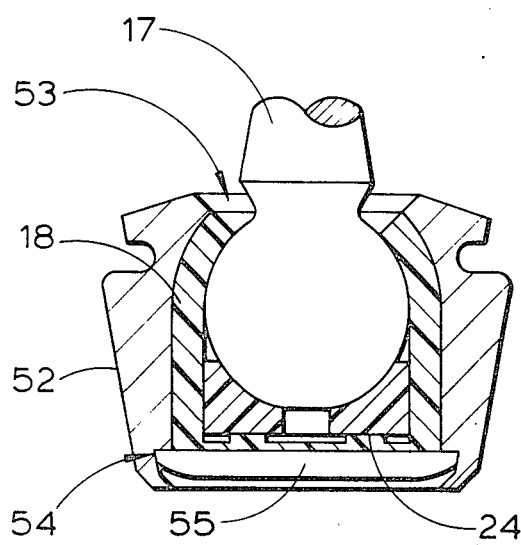

Whilst the invention has been described using a rack-end joint as an example, it is equally applicable for use in other ball and socket joints including steering control arm joints shown in FIG. 3 in which the housing 52 is substantially cylindrical having a mouth 53 at one end through which the ball pin shank 17 extends, and an aperture 54 at the other end closed, after assembly of the joint, by a cover plate 55. The assembly operation of the cover plate 55 into the other end of the joint applies the necessary pre-load to the ribs 24 in the base of the bearing cup 18. In this particular construction it is possible for the base 23 of the bearing cup 18 to be replaced by a seperable disc having the ribs moulded thereon.

I claim:

1. A ball and socket assembly for the steering and suspension system of a motor vehicle and comprising:
    a socket housing having a cavity defined therein;
    a ball pin, the head of which is located in the cavity and the shank of which extends through the mouth of said cavity;
    a resilient cup shaped lining located in the cavity and the mouth of which provides a bearing surface for the head of the pin adjacent the mouth of the cavity; and
    a resilient end cap located in the base of the cup shaped lining to provide a bearing surface for the head of the pin in the base of the cavity, said end cap having a face thereon that is opposed to a co-operating face of the cup shaped lining, said opposed faces being spaced apart by resilient projections held in compression by the assembly of the joint.

2. An assembly as claimed in claim 1, wherein the projections are integral with the base of the lining.

3. An assembly as claimed in claim 2, wherein the projections are ribs that radiate from a centre located on an axis passing through the centre of the head of the pin.

4. An assembly as claimed in claim 3, wherein the ribs are formed as sets of ribs having different respective heights.

5. An assembly as claimed in claim 1, wherein the resilient lining is a unitary cup fitted into the cavity.

* * * * *